United States Patent Office 3,098,848
Patented July 23, 1963

3,098,848
DIARYLTHIOPHENE SULFONIC ACIDS
Harry Braus, Springdale, and Otto A. Homberg, Woodlawn, Ohio, assignors to National Distillers and Chemical Corporation, New York, N.Y., a corporation of Virginia
No Drawing. Filed Aug. 15, 1960, Ser. No. 49,411
5 Claims. (Cl. 260—329)

This invention relates to new and novel derivatives of diarylthiophene and, more particularly, to sulfonic acids of diphenylthiophene, to derivatives thereof, and to methods for the preparation of these new compositions of matter.

Many materials such as paper, textiles, and plastics tend to have, or to acquire while being processed, yellowish casts, thus requiring the addition to these materials of a substance which will add to their apparent brightness. Suitable brighteners, often referred to as optical bleaches are fluorescent compounds which have little self-color, but which transmute invisible ultraviolet radiations into intensely bright visible color effects, usually blue, which act to mask the undesired yellowing.

It is an object of the present invention to provide compounds which will be useful as optical brighteners or bleaches.

It is another object of this invention to produce diarylthiophene sulfonic acids and certain of their derivatives which have fluorescent properties which render them valuable as optical bleaches.

It is a further object of this invention to sulfonate diarylthiophene under certain conditions by contacting the same with a suitable sulfonating agent.

It is a still further object of this invention to produce metal salts of the diarylthiophene sulfonic acid, prepared by the aforesaid reaction, by contacting said acid with an inorganic salt or hydroxide of the desired metal.

Other objects will be apparent from the following description of the invention.

In accordance with the present invention a diarylthiophene, for example diphenylthiophene, is reacted with a sulfonating agent, as for example concentrated sulfuric acid. The novel product consists of a mixture of diarylthiophene sulfonic acids containing two and three SO₃H groups with a preponderance of the compound containing three SO₃H groups. The compounds of this invention may be represented by the following formulas:

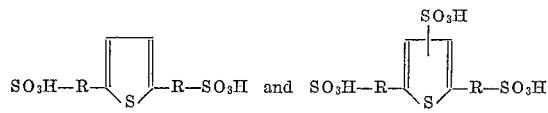

wherein R is an aryl group.

In a preferred method of carrying out this reaction, diphenylthiophene is heated with concentrated sulfuric acid until it is completely dissolved. Sulfonation may occur at any temperature between about 0° and 200° C. Optimum yields are obtained by carrying out the sulfonation reaction at about 140° to 150° C. The sulfonic acid may be separated from the reaction mixture by any standard procedure, such as for example by recrystallization of the acid from concentrated hydrochloric acid; or by saturation with NaCl solution or by partial neutralization with lime, followed by salting out to obtain the sodium salt of the sulfonic acid.

Although the present invention will be described primarily with respect to the sulfonation of 2,5-diphenylthiophene, it is not intended that the process be limited thereto as it is equally applicable to the sulfonation of other diarylthiophenes. Thus the present process may also be applied to 2,4-diphenylthiophene, 3,4-diphenylthiophene, and the like.

The diarylthiophenes used as the starting material in the process embodied herein may be prepared by any convenient method. Known methods of preparation include, for example, the pyrolysis of anhydroacetophenone disulfide, heating (BzCH₂)₂S with P₂S₅, treating styrene with sulfur, and others.

The diarylthiophene sulfonic acids described above may, in accordance with this invention, be prepared by reacting diarylthiophenes with a suitable sulfonating agent, such as concentrated sulfuric acid. Chlorosulfonic acid, oleum, or the like may also be used for sulfonating. The ratio of sulfonating agent to diarylthiophene may be varied over a wide range depending upon the sulfonating agent used and the degree of sulfonation desired in the product. In general it may range from a ratio of about 2 to about 20 moles of sulfonating agent per mole of diarylthiophene, with a preferred ratio being about 6 to 8 moles of sulfonating agent per mole of diarylthiophene. When concentrated sulfuric acid is used as the sulfonating agent, the ratio is preferably about 8 moles of sulfuric acid per mole of diarylthiophene.

The reaction temperature will also depend upon the sulfonating agent selected. For example, when concentrated sulfuric acid is used, the reaction will take place at any temperature within the range of about 0° to 200° C.; optimum yields are obtained when the reaction temperature is between about 140° and 150° C.

The process embodied herein may be carried out either in a batchwise, semi-continuous, or continuous manner. Although agitation of the mixture is not required, it is generally convenient to employ some gentle stirring.

The sulfonation of diarylthiophene yields a product which comprises a mixture of sulfonic acids containing two SO₃H groups and sulfonic acids containing three SO₃H groups, there being a preponderance of the compound containing three SO₃H groups. The sulfonation of 2,5-diphenylthiophene, for example, yields a mixture of both (I) and (II):

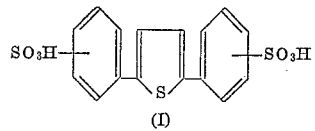
(I)

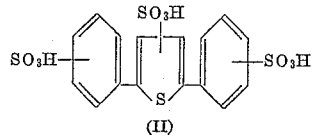
(II)

The orientation of the sulfonic groups in diarylthiophene sulfonic acids has not been established with certainty. Indications are, however, that the sulfonic acids of 2,5-diphenylthiophene, for example, contain a sulfonic group in the para position of each benzene ring; when the thiophene ring is sulfonated, the sulfonic group is presumably in the three position. The orientation, however, does not appear to be of significance in the practical synthesis of optical bleaches, antioxidants, and the like from the diarylthiophenes so sulfonated.

In order to prepare metal salts thereof, such as for example alkali metal or alkaline earth metal salts, the diarylthiophene sulfonic acids, prepared as above, are dissolved in a suitable solvent, such as alcohol, and the solution of sulfonic acids is converted to the desired metal salt by simple neutralization thereof with a metal hydroxide, carbonate, or other alkaline inorganic salt of the metal. Alternatively, synthesis of the desired metal salt may be accomplished by metathesis of an alkali metal sulfonate prepared by a method such as the one described above with an inorganic halide of the desired metal.

The temperature at which the metal salt of diarylthiophene sulfonic acids is prepared will generally be in the range of from about 50° to about 200° C., and preferably between about 85° and 150° C. The reaction mixture is maintained at an elevated temperature in the above range until all of the water of reaction is removed. During this operation it is desirable, but not necessary, to bubble an inert dry gas such as nitrogen through the mixture in order to hasten the removal of said water. The resulting mixture is then suitably filtered through a clarifying agent, such as a filtering clay, to yield a solution of a metal diarylthiophene sulfonate.

Alkali fusion of the alkali metal sulfonates may be accomplished by heating the appropriate sulfonate at elevated temperature, e.g., about 200° to 265° C., with caustic.

The diarylthiophene sulfonic acids described above have been found to be particularly useful as optical bleaches. They are colorless solids which dissolve in water to yield intensely fluorescent solutions. They are substantive to wool, imparting thereto a reddish fluorescence. The above-described fused metal diarylthiophene sulfonates may be incorporated in paper, cotton, and other fibers, serving therein as optical brighteners. The fused sulfonates, which are highly substantive to cotton and cellulose, impart to them an intense bluish-white fluorescence. They find application also as antioxidants, for example, for polymer stabilization. Ordinarily the new compositions described above will be added to the material being treated in amounts ranging from about 0.1 to about 5 percent.

Further details and advantages of this invention will be apparent from the following illustrative examples. Unless otherwise specified, all parts are given by weight.

*Example 1*

Ten parts of 2,5-diphenylthiophene and 20 parts of concentrated sulfuric acid were heated together for about 4 hours at 140° to 150° C. until a green solution, indicating complete sulfonation, was formed. The 2,5-diphenylthiophene sulfonic acids thus prepared were isolated by treating with an excess of concentrated hydrochloric acid in order to recrystallize the sulfonic acids. The yield was 95 percent, based on the 2,5-diphenylthiophene. Analysis of the p-toluidine salts of the sulfonic acids showed the following:

|  | M.P., °C. | Percent C | Percent H | Percent N | Percent S |
|---|---|---|---|---|---|
| Found | 279-286 | 56.78 | 5.60 | 4.80 | 15.31 |
| Calculated for $C_{37}H_{39}N_3O_9S_4$ |  | 55.68 | 4.9 | 5.26 | 16 |

The mixture of sulfonic acids of 2,5-diphenylthiophene may be converted to an optical brightener by fusion with caustic, as is shown in the following example.

*Example 2*

One part of the 2,5-diphenylthiophene sulfonic acids, prepared as in Example 1, was treated with an excess of NaOH to form sodium diphenylthiophene sulfonate. To a mixture of 15 parts of NaOH and 5 parts of KOH in a metal crucible were added 1 part of distilled water and 10 parts of the sodium diphenylthiophene sulfonate. The mixture was heated at about 240°–265° C. in a metal bath for about 15 minutes. The product was then dissolved in 100 parts of hot distilled water, cooled to about 10° C., and treated with concentrated HCl until a pH of 5 was attained. The mixture was then cooled to about 25° C. and filtered, and the precipitate was oven-dried.

To demonstrate its application as an optical bleach, about 10 milligrams of the fused sodium diphenylthiophene sulfonate prepared as above were added to a liter of water which contained about 15 grams of a pure wetting agent, such as sodium alkylaryl sulfonate. Virgin cotton was soaked in the solution for several minutes with the temperature of the solution being kept at about 160° F. The cotton was then removed from the solution and thoroughly rinsed with water. When dry, the fabric was viewed under a black light lamp and intense bluish white fluorescence was observed.

The above-described compositions are merely illustrative of those contemplated by the present invention. It is possible to produce still other embodiments without departing from the inventive concept herein disclosed, and it is desired therefore that only such limitations be imposed on the appended claims as are stated therein.

What is claimed is:

1. The compound having the formula

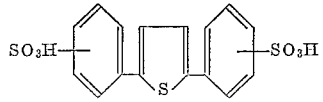

2. The compound having the formula

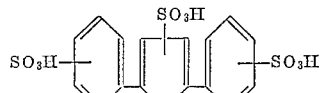

3. The compound having the formula

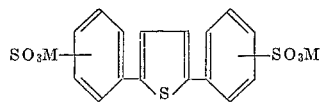

where M is a metal selected from the group consisting of alkali metals and alkaline earth metals.

4. The compound having the formula

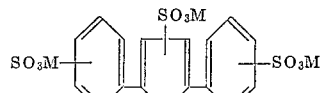

where M is a metal selected from the group consisting of alkali metals and alkaline earth metals.

5. A composition consisting of a mixture of compounds of the formulas

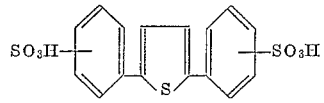

and

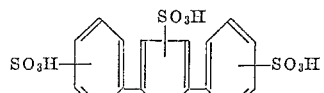

References Cited in the file of this patent

Hartough: Thiophene and Its Derivatives, page 421 (1952).

Royals: Advanced Organic Chemistry, pages 461–62 (1956).